(12) United States Patent
Wegner

(10) Patent No.: US 6,754,839 B1
(45) Date of Patent: Jun. 22, 2004

(54) UART CLOCK WAKE-UP SEQUENCE

(75) Inventor: Glenn Wegner, Cupertino, CA (US)

(73) Assignee: Exar Corporation, Fremont, CA (US)

( * ) Notice: Subject to any disclaimer, the term of this patent is extended or adjusted under 35 U.S.C. 154(b) by 0 days.

(21) Appl. No.: 09/528,090

(22) Filed: Mar. 17, 2000

(51) Int. Cl.[7] .............................. H06F 1/04; H06F 1/32
(52) U.S. Cl. ........................ 713/500; 713/320; 713/501
(58) Field of Search ................................. 713/500, 400, 713/300, 320, 322, 323, 324, 501; 716/6; 370/517; 710/47

(56) References Cited

U.S. PATENT DOCUMENTS

| | | | | |
|---|---|---|---|---|
| 4,260,912 A | * | 4/1981 | Bjorke | 327/286 |
| 4,956,618 A | * | 9/1990 | Ulmer | 331/116 FE |
| 5,243,637 A | * | 9/1993 | Flaherty et al. | 377/95 |
| 5,682,508 A | * | 10/1997 | Hocker, III | 709/234 |
| 5,848,281 A | | 12/1998 | Smalley et al. | |
| 5,903,601 A | * | 5/1999 | Elnashar et al. | 375/220 |
| 6,167,078 A | * | 12/2000 | Russo | 375/222 |
| 6,195,715 B1 | * | 2/2001 | Hoge et al. | 710/47 |

FOREIGN PATENT DOCUMENTS

| | | | | |
|---|---|---|---|---|
| EP | 0 511 769 | | 11/1992 | |
| EP | 779741 A2 | * | 6/1997 | H04N/7/26 |
| JP | 63-80123 | | 4/1988 | |

OTHER PUBLICATIONS

IBM, DC–DC Convertor Self Synchronization Circuit, Sep. 1, 1991, IBM Technical Disclosure Bulletin, vol. 34, pp. 423–427.*

* cited by examiner

*Primary Examiner*—Dennis M. Butler
*Assistant Examiner*—Suresh K Suryawanshi
(74) *Attorney, Agent, or Firm*—Townsend and Townsend and Crew LLP

(57) ABSTRACT

A UART with a clock oscillator that has a sleep mode. A counter is connected to the output of the clock oscillator. When the clock oscillator is awakened, the counter counts up to a specified count. Upon reaching the specified count, the output of the counter is enabled, which is connected to an interrupt line for generating an interrupt. In one embodiment, the IC need not be a UART, and no interrupt code (or a default code of all zeros or other default) is provided for the interrupt, thus eliminating the need for an additional interrupt register or additional room in existing interrupt registers. The user, such as a CPU, upon receiving the interrupt will look for an interrupt code. The absence of the interrupt code, combined with the user's knowledge that the integrated circuit was previously asleep, allows the user to determine that the interrupt indicates a clock wake-up.

13 Claims, 2 Drawing Sheets

UART CLOCK WAKE-UP SEQUENCE

BACKGROUND OF THE INVENTION

The present invention relates to integrated circuits, in particular universal asynchronous receiver transmitters (UARTs), and more particularly to wake-up sequences.

A UART is typically used in communications to convert a data stream from parallel to serial. This enables a serial data stream to communicate with a central processing unit or CPU. In order to conserve energy, the UART may be put in a sleep mode where its oscillator is put to sleep as well.

Upon a subsequent start-up of the UART, it will take some amount of time before the oscillator is stable and the data transmitted or received can be guaranteed to be stable. Unlike a microprocessor, where it cannot operate until the clock is stable, data could be sent to a UART before knowing whether its clock was stable or not.

The typical approach for dealing with the wake-up of a UART is to set forth in the specification for the UART that a certain period of time must be allowed to pass after the UART is awakened and before data is transmitted or received. If an attempt is made to transmit or receive data too soon, before the clock is stable, the data can be corrupted. The specified waiting time must be sufficiently long to account for variations in the process and stability of the oscillator from wafer to wafer, and also to account for other variations. Accordingly, the specified time is often longer than necessary, imposing an additional delay on the system.

SUMMARY OF THE INVENTION

The present invention provides a UART with a clock oscillator that has a sleep mode. A counter is connected to the output of the clock oscillator. When the clock oscillator is awakened, the counter counts up to a specified count. Upon reaching the specified count, an output of the counter is enabled which is connected to an interrupt line for generating an interrupt.

In one embodiment, the IC need not be a UART, and no interrupt code is provided for the interrupt, thus eliminating the need for an additional interrupt register or additional room in existing interrupt registers. The user, such as a CPU, upon receiving the interrupt will look for an interrupt code. The absence of the interrupt code (or the presence of all zeros or some other default value not associated with another interrupt code), combined with the user's knowledge that the integrated circuit was previously asleep, allows the user to determine that the interrupt indicates a clock wake-up.

In a preferred embodiment, the integrated circuit is a UART device. The counter can be programmed to a value corresponding to the time to achieve stability for the clock. This could be done on a device-by-device or wafer-by-wafer basis, if desired. Alternately, a single conservative value could be used for the counter. Eight bits has been chosen for a preferred embodiment of the counter.

The interrupt generator counter is preferably accessible via a PCI bus by the host. The interrupt registers which contain codes for the interrupt source are required to be zero upon putting the device to sleep. Thus, upon wake-up, the microprocessor will detect no interrupt code and will conclude that the interrupt corresponds to a clock wake-up and that transmission and reception of data is now possible.

For a further understanding of the nature and advantages of the invention, reference should be made to the following description taken in conjunction with the accompanying drawings.

DESCRIPTION OF THE SPECIFIC EMBODIMENTS

Figure 1:
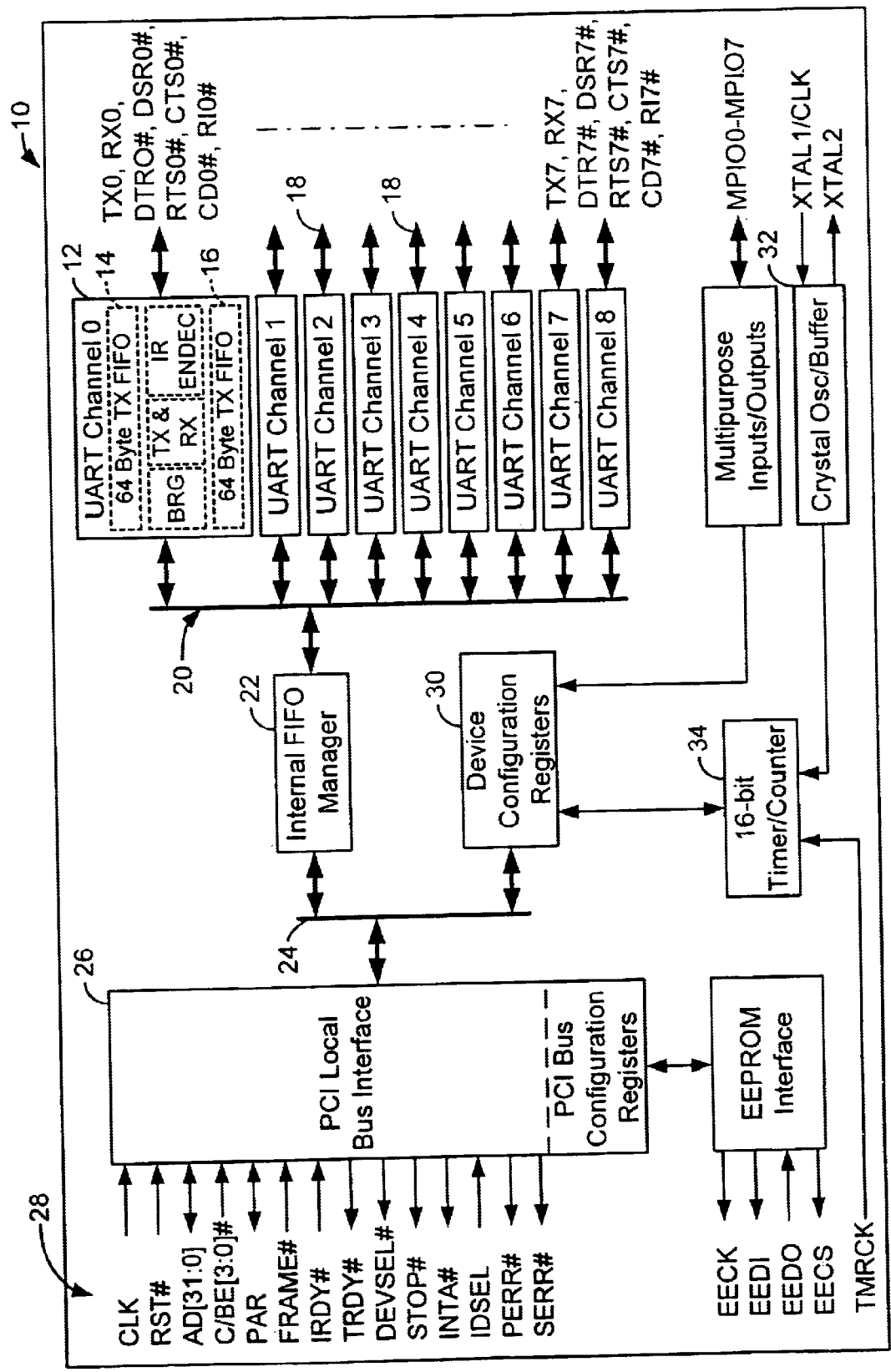
FIG. 1 is a block diagram of a UART incorporating the present invention.

FIG. 1 is a block diagram of a UART 10. The UART includes eight channels 12. Channel 0 indicates the internal circuitry for that channel, which is not shown but would be the same for the other eight channels. In particular, it has a 64-bit transmit first in/first out (FIFO) buffer 14 and a 64-byte receive FIFO 16. The channel also includes other control circuitry and registers. The channels interface via I/O lines 18 to serial data communication lines. The data can be provided through an internal bus 20 to an internal FIFO manager 22. The FIFO manager provides the data in both directions through a second internal bus 24 to a PCI local bus interface 26. This interfaces with a PCI bus 28.

Also shown in FIG. 1 is an oscillator 32. This oscillator is put to sleep in the sleep mode according to the present invention. A timer/counter 34 is used during operation of the UART, and is not the counter used to determine when the oscillator is awake.

Figures 2, 3:
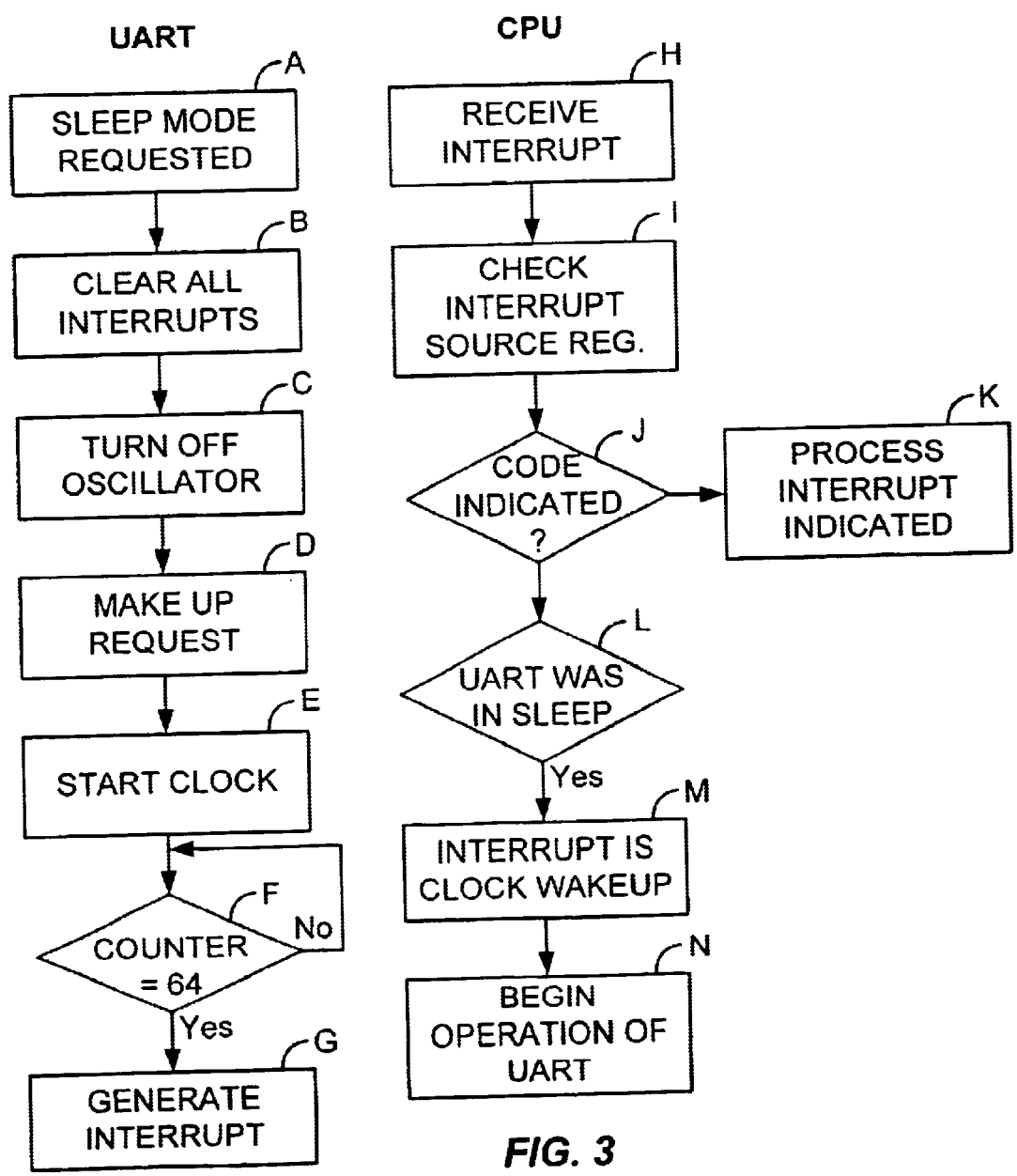
FIG. 2 is a block diagram of the oscillator and counter circuit for generating a wake-up interrupt according to the invention.
FIG. 3 is a flowchart illustrating the wake-up process according to an embodiment of the invention.

FIG. 2 is a diagram of the wake-up interrupt circuitry of the invention. Oscillator 32 has an output 36 which is provided as an input to a counter 38. In one embodiment, counter 38 is an 8-bit counter which will count up to a value of 64 clocks. In this embodiment, 16 clocks are used for each cycle of the UART, and accordingly the 64 clock cycle count corresponds to four transmission cycles. When the counter reaches this count, it will generate an output signal on a line 40 which is provided as an interrupt. This interrupt signal is provided through the PCI local bus interface 26 to the CPU.

FIG. 3 is a flowchart illustrating the steps taken by the UART and the CPU in an embodiment of the invention. When sleep mode is requested (Step A) all interrupts are first cleared (Step B) before putting the device to sleep. When the UART is put to sleep, the oscillator is turned off (Step C). When a wake-up request is subsequently received (Step D) the clock is started (Step E). When the counter reaches 64 (Step F) an interrupt is generated (Step G).

On the CPU side, when it receives an interrupt (Step H) it checks the interrupt source registers (Step I). If a code is indicated (Step J) the interrupt indicated is processed (Step K).

If no code is provided (actually a default "code" of all zeros may be present, or some other default), the microprocessor determines whether the UART was previously asleep (Step L). If it was asleep, the microprocessor concludes that the interrupt is a clock wake-up interrupt (Step M). The microprocessor then begins operation of the UART for transmitting or receiving data (Step N).

As will be understood by those of skill in the art, the present invention may be embodied in other specific forms without departing from the essential characteristics thereof. Accordingly, the foregoing description is intended to be illustrative, but not limiting, of the scope of the invention which is set forth in the following claims.

What is claimed is:

1. A UART integrated circuit external to a microprocessor comprising:
   a transmit FIFO buffer;
   a receive FIFO buffer;
   a clock oscillator having a sleep mode;
   a counter connected to an output of said clock oscillator and configured to count clock pulses upon an awakening of said clock oscillator;
   an interrupt line connected to an output of said counter to provide an interrupt signal to said microprocessor external to said UART when said counter reaches a programmed value;
   an interrupt register.

2. The integrated circuit of claim 1 wherein said interrupt register does not have an assigned interrupt code for a wake-up of said clock.

3. The integrated circuit of claim 1 wherein said interrupt register has all zeros when it does not have an assigned interrupt code.

4. The integrated circuit of claim 1 wherein said counter is an 8 bit counter.

5. The integrated circuit of claim 1 further comprising a sleep circuit for putting said clock oscillator to sleep.

6. The integrated circuit of claim 1 wherein said interrupt line is coupled to an interrupt line of a PCI bus.

7. A method for operating a UART integrated circuit external to a microprocessor comprising:
   starting a clock oscillator in said integrated circuit;
   counting clock cycles output by said clock oscillator;
   generating an interrupt signal to said microprocessor when a predetermined count of clock cycles is reached;
   determining, in response to said interrupt signal, that said clock oscillator is stable; and
   beginning operation of said integrated circuit.

8. The method of claim 7 further comprising:
   providing no assigned interrupt code with said interrupt signal;
   determining, in response to said interrupt signal with no assigned interrupt code, that said interrupt indicates that said clock oscillator is stable.

9. The method of claim 8 wherein an interrupt register has all zeros when it does not have an assigned interrupt code.

10. The method of claim 7 further comprising:
    putting said oscillator to sleep only when no interrupts are pending;
    setting a counter to zero when said oscillator is put to sleep; and
    clearing an interrupt register when said oscillator is put to sleep.

11. The method of claim 7 further comprising:
    beginning the transmission and reception of data through said UART after the generating of said interrupt.

12. An UART integrated circuit device external to a microprocessor comprising:
    a clock oscillator having a sleep mode;
    a counter connected to an output of said clock oscillator;
    an interrupt line connected to an output of said counter to provide an interrupt signal to said microprocessor;
    an interrupt register without an interrupt code for a wake-up of said clock.

13. The method of claim 7 further comprising:
    setting said predetermined count to correspond to the time for said clock oscillator to reach stability.

* * * * *